US012770133B2

(12) United States Patent
Feng et al.

(10) Patent No.: US 12,770,133 B2
(45) Date of Patent: Oct. 20, 2026

(54) DATA PROCESSING METHOD, TERMINAL DEVICE AND DATA PROCESSING SYSTEM

(71) Applicant: Advanced New Technologies Co., Ltd., Grand Cayman (KY)

(72) Inventors: Chunpei Feng, Grand Cayman (KY); Wenbo Yang, Grand Cayman (KY); Mian Huang, Grand Cayman (KY)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 19/005,167

(22) Filed: Dec. 30, 2024

(65) Prior Publication Data

US 2025/0139606 A1 May 1, 2025

Related U.S. Application Data

(63) Continuation of application No. 16/942,513, filed on Jul. 29, 2020, now abandoned, which is a continuation of application No. PCT/CN2019/073560, filed on Jan. 29, 2019.

(30) Foreign Application Priority Data

Feb. 24, 2018 (CN) ......................... 201810157076.3

(51) Int. Cl.
*G06Q 20/32* (2012.01)

(52) U.S. Cl.
CPC ..... *G06Q 20/3276* (2013.01); *G06Q 20/3223* (2013.01); *G06Q 20/326* (2020.05); *G06Q 20/3274* (2013.01)

(58) Field of Classification Search
None
See application file for complete search history.

(56) References Cited

U.S. PATENT DOCUMENTS

2018/0240095 A1 * 8/2018 Buckley ............ G06Q 30/0601

OTHER PUBLICATIONS

European Communication pursuant to Article 94(3) for Application 19758220.8, dated Jun. 26, 2024, 5 pages.
Second Office Action issued on Oct. 30, 2023 for counterpart European patent application No. 19758220.8, 5 pages.
The Fourth Office Action issued on Oct. 31, 2025 for counterpart European patent application No. 19758220.8 (4 pages).

* cited by examiner

*Primary Examiner* — Edward Chang
*Assistant Examiner* — Amit Patel
(74) *Attorney, Agent, or Firm* — Nutter McClennen & Fish LLP

(57) ABSTRACT

A data processing method, a terminal device and a data processing system. The method comprises: receiving communication information broadcasted by means of wireless communication, wherein the communication information comprises feature information and a payment channel identifier of a second terminal device; acquiring its own feature information; when its own feature information matches the feature information in the communication information, generating a payment code based on the payment channel identifier. By means of the data processing method, the terminal device and the data processing system, the user experience can be improved.

17 Claims, 5 Drawing Sheets

DATA PROCESSING METHOD, TERMINAL DEVICE AND DATA PROCESSING SYSTEM

CROSS-REFERENCE TO RELATED APPLICATION

This application is a continuation of U.S. patent application Ser. No. 16/942,513, filed Jul. 29, 2020, which is a continuation of International Application No. PCT/CN2019/073560, filed Jan. 29, 2019, which claims priority to Chinese Patent Application No. 201810157076.3, filed on Feb. 24, 2018, each of which is hereby incorporated by reference in its entirety.

TECHNICAL FIELD

The embodiments in the present disclosure relate to the technical field of computers, and particularly, to a data processing method, a terminal device and a data processing system.

BACKGROUND

With the development of the smart clients and the popularization of the network applications, users can implement various transaction operations through the smart terminal devices, making shopping or consumption operations more convenient. In the related arts, a user may employ a terminal device to generate a payment code when it is necessary to make an offline transaction payment. The merchant may scan the payment code using the terminal device to implement the offline transaction payment.

However, when an offline transaction payment is to be made, the user often needs to open a payment application and then perform one or more operations in an interface of the payment application to enable the payment application to generate a payment code, thus the process of the offline transaction payment is complicated and the user experience is poor.

SUMMARY

An objective of the embodiments of the present disclosure is to provide a data processing method, a terminal device and a data processing system, so as to reduce the user operations and improve the user experience.

In order to achieve the objective, the embodiments of the present disclosure provide a data processing method, including: acquiring, by a first terminal device, feature information of a second terminal device; acquiring, by the first terminal device, a payment channel identifier; broadcasting, by the first terminal device, communication information comprising the feature information and the payment channel identifier via wireless communication; receiving, by the second terminal device, the communication information; acquiring, by the second terminal device, feature information of the second terminal device; and generating, by the second terminal device, a payment code for the first terminal device to scan based on the payment channel identifier, when the feature information of the second terminal device matches the feature information in the communication information.

In order to achieve the objective, the embodiments of the present disclosure provide a data processing method, including: acquiring feature information of a second terminal device; acquiring a payment channel identifier; and broadcasting communication information comprising the feature information and the payment channel identifier via wireless communication, to enable the second terminal device to generate a payment code based on the communication information.

In order to achieve the objective, the embodiments of the present disclosure provide a terminal device, including: a first acquisition unit configured to acquire feature information of a second terminal device; a second acquisition unit configured to acquire a payment channel identifier; and a broadcast unit configured to broadcast communication information comprising the feature information and the payment channel identifier via wireless communication, to enable the second terminal device to generate a payment code based on the communication information.

In order to achieve the objective, the embodiments of the present disclosure provide a terminal device, including a memory and a processor, wherein the memory is configured to store computer instructions, and wherein the processor is configured to execute the computer instructions to implement steps of: acquiring feature information of a second terminal device; acquiring a payment channel identifier; broadcasting communication information comprising the feature information and the payment channel identifier via wireless communication, to enable the second terminal device to generate a payment code based on the communication information.

In order to achieve the objective, the embodiments of the present disclosure provide a data processing method, including: receiving communication information broadcasted via wireless communication, which comprises feature information and a payment channel identifier; acquiring own feature information; and generating a payment code based on the payment channel identifier, when the own feature information matches the feature information in the communication information.

In order to achieve the objective, the embodiments of the present disclosure provide a terminal device, including: a reception unit configured to receive communication information broadcasted via wireless communication, which comprises feature information and a payment channel identifier; an acquisition unit configured to acquire own feature information; and a generating unit configured to generate a payment code based on the payment channel identifier when the own feature information matches the feature information in the communication information.

In order to achieve the objective, the embodiments of the present disclosure provide a terminal device, including a memory and a processor, wherein the memory is configured to store computer instructions, and wherein the processor is configured to execute the computer instructions to implement steps of: receiving communication information broadcasted via wireless communication, which comprises feature information and a payment channel identifier; acquiring own feature information; generating a payment code based on the payment channel identifier when the own feature information matches the feature information in the communication information.

In order to achieve the objective, the embodiments of the present disclosure provide a data processing system, including a first terminal device and a second terminal device. The first terminal device is configured to acquire feature information of the second terminal device; acquire a payment channel identifier; and broadcast communication information comprising the feature information and the payment channel identifier via wireless communication, to enable the second terminal device to generate a payment code based on the communication information. The second terminal device is configured to receive communication information broadcasted via wireless communication, which comprises feature information and a payment channel identifier; acquire own feature information; and generate a payment code based on the payment channel identifier to be scanned by the first terminal device, when the own feature information matches the feature information in the communication information.

As can be seen from the technical solutions provided by the above embodiments of the present disclosure, in the embodiments of the present disclosure, the second terminal device may receive communication information, which includes feature information and a payment channel identifier of the second terminal device and which is broadcasted via wireless communication, acquire own feature information, and generate a payment code based on the payment channel identifier when the own feature information matches the feature information in the communication information. In this way, the user does not need to perform too many operations when making an offline transaction payment, and the second terminal device can generate a payment code to be scanned by the first terminal device, thereby improving the user experience.

BRIEF DESCRIPTION OF THE DRAWINGS

In order to more clearly explain the technical solutions in the embodiments of the present disclosure or in the prior art, the drawings to be used to describe the embodiments or of the prior art will be briefly introduced as follows. Obviously, the drawings in the following description merely illustrate some embodiments of the present disclosure, and persons of ordinary skill in the art may acquire other drawings from them without paying any creative labor.

DETAILED DESCRIPTION

Figure 1:
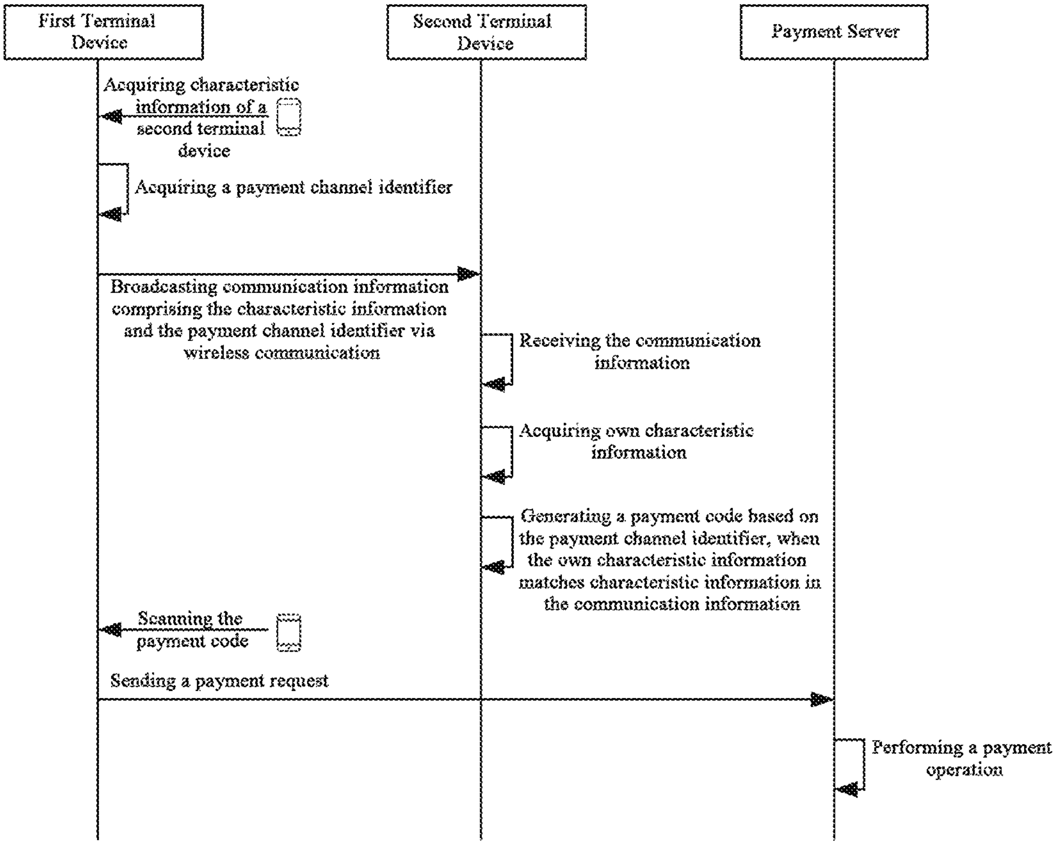
FIG. 1 is a schematic diagram of a data processing method according to an embodiment of the present disclosure.
Figure 2:
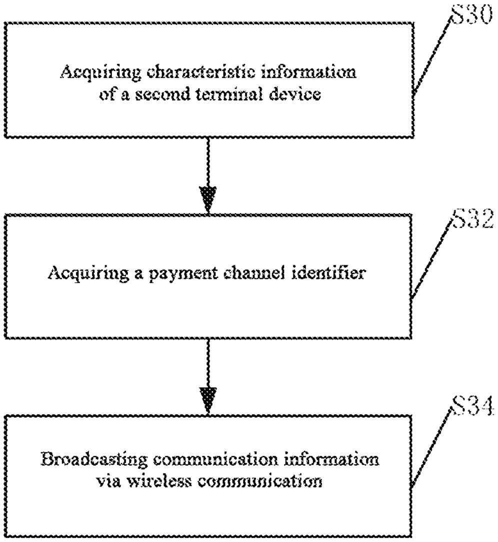
FIG. 2 is a flowchart of a data processing method according to an embodiment of the present disclosure.
Figure 3:
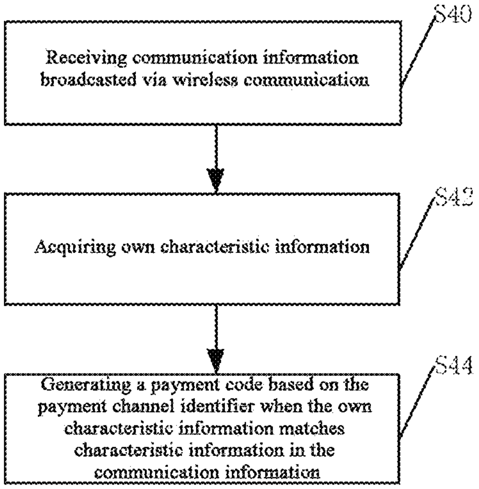
FIG. 3 is a flowchart of a data processing method according to an embodiment of the present disclosure.
Figure 4:
FIG. 4 is a schematic diagram of a desktop content displayed by a second terminal device according to an embodiment of the present disclosure.
Figure 5:
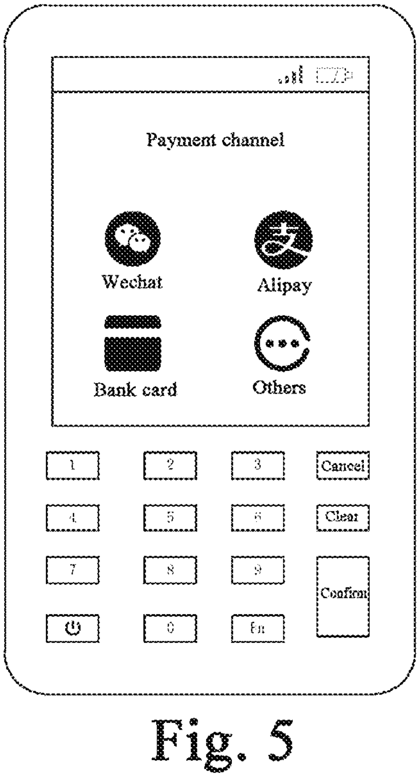
FIG. 5 is a schematic diagram of a payment channel identifier provided by a first terminal device according to an embodiment of the present disclosure.
Figure 6:
FIG. 6 is a schematic diagram of a payment code generated by a second terminal according to an embodiment of the present disclosure.

In the following, the technical solutions in the embodiments of the present disclosure will be clearly and completely described with reference to the drawings for the embodiments of the present disclosure. Obviously, those described are just a part, rather than all, of the embodiments of the present disclosure. Based on the embodiments in the present disclosure, any other embodiment obtained by persons of ordinary skill in the art without paying any creative labor should fall within the protection scope of the present disclosure.

Please refer to FIGS. 1, 4, 5 and 6. The embodiments of the present disclosure provide a data processing system.

In this embodiment, the data processing system may include a first terminal device. The first terminal device may be used for receiving payment. The first terminal device may have a function of generating a payment code which may include a graphical code, an acoustic code, etc., and the graphical code may include a bar code, a two-dimensional code, etc. The first terminal device may have a function of short-range wireless communication. The short-range wireless communication may refer to a communication in a short distance, including but not limited to, Bluetooth, IrDA, WI-FI, Ultra Wide Band, Zigbee, Near Field Communication, NFC, etc. The first terminal device may specifically be a mobile device, such as a smart phone, a tablet electronic device, a portable computer, a personal digital assistant (PDA), a vehicle-mounted device, a POS machine (e.g., a merchant POS machine, a bus POS machine, etc.), or a smart wearable device, etc. The first terminal device may also be a desktop device, such as a server, an industrial control computer, a personal computer (PC), an all-in-one machine, or a smart self-service terminal (kiosk) (e.g., a subway ticket vending machine, a train ticket vending machine), etc.

In this embodiment, the data processing system may further include a second terminal device. The second terminal device may be used for payment. The second terminal device may have a function of generating a payment code. The second terminal device may have a function of short-range wireless communication. The second terminal device specifically may be a smart phone, a tablet electronic device, a portable computer, a personal digital assistant (PDA), or a smart wearable device, etc.

In an implementation of this embodiment, the data processing system may further include a payment server. The payment server may be one server or a server cluster including multiple servers. The payment server may be used to perform a payment operation.

Please refer to FIGS. 1, 4, 5 and 6. The embodiments of the present disclosure provide a data processing method. What implements the data processing method may include a first terminal device and a second terminal device. In order to enable a data transmission, the function of short-range wireless communication of the first terminal device and the second terminal device may be in an ON state. The data processing method may include the following steps.

Step S10: a first terminal device acquires feature information of a second terminal device.

In this embodiment, the feature information may be used to locate the second terminal device from among multiple terminal devices including the second terminal device. The feature information may be any form of information, which is not specifically limited in this embodiment. For example, the feature information may be image information, feature information extracted from the image information, sound information, feature information extracted from the sound information, text information, video information, or feature information extracted from the video information, etc.

In an implementation of this embodiment, the first terminal device may have a capturing function. The first terminal device may use its own capturing function to collect image information from the second terminal device, and directly take the collected image information as the feature information of the second terminal device, or extract feature information from the image information.

Specifically, the first terminal device may capture a content displayed by the second terminal device to obtain image information. For example, the first terminal device may capture a desktop content displayed by the second terminal device to obtain image information. For another example, the second terminal device may have at least one piece of image information, and select one image information from the at least one piece of image information for displaying. The first terminal device may capture image information displayed by the second terminal device to obtain image information.

Specifically, the feature information extracted by the first terminal device from the image information may include semantic feature information and/or visual feature information. The semantic feature information may be semantics of the image information, and the visual feature information may include feature information such as color, texture, shape, etc. of the image information. The first terminal device may specifically extract feature information from the image information using any algorithm, which is not specifically limited in this embodiment. For example, the first terminal device may extract the feature information from the image information using an image feature extraction algorithm based on a Convolutional Neural Network (CNN) or an image feature extraction algorithm based on a Markov Random Filed model (MRF).

In another implementation of this embodiment, the first terminal device may have a capturing function. The second terminal device may display text information. The first terminal device may use its own capturing function to collect the text information displayed by the second terminal device, and directly take the feature information as the feature information of the second terminal device, or extract semantic feature information from the text information.

It should be noted that persons skilled in the art would understand that the first terminal device may also obtain the feature information of the second terminal device in other ways, which will not be enumerated here.

Step S12: the first terminal device acquires a payment channel identifier.

In this embodiment, the payment channel identifier may be used to identify the payment channel, which may include an Alipay two-dimensional code, an Alipay acoustic code, a WeChat two-dimensional code, a JD two-dimensional code, etc. The payment channel identifier may be pre-associated with a payment application. Specifically, one payment application may be pre-associated with at least one payment channel identifier, and the payment channel identifiers pre-associated with different payment applications will be different. For example, the payment application may include the Alipay and the WeChat. The Alipay may be pre-associated with a payment channel identifier ALIPAYQRCODE and a payment channel identifier ALIPAYSOUND, the payment channel identifier ALIPAYQRCODE may be used to identify the Alipay two-dimensional code payment channel, and the payment channel identifier ALIPAYSOUND may be used to identify the Alipay acoustic code payment channel. The Wechat may be pre-associated with a payment channel identifier WEPAYQRCODE, and the payment channel identifier WEPAYQRCODE may be used to identify the payment channel for Wechat two-dimensional code.

In an implementation of this embodiment, the first terminal device may provide at least one payment channel identifier, and upon receipt of a user operation for selecting a payment channel identifier, select the payment channel identifier indicated by the user operation from the at least one payment channel identifier. Specifically, each payment channel identifier provided by the first terminal device may be corresponding to a hotspot for receiving the user operation. Upon detection of the user operation, the first terminal device may acquire a trigger zone corresponding to the user operation, and select, from the at least one payment channel identifier, a payment channel identifier having a corresponding hotspot that matches the trigger zone. The user operation here includes, but is not limited to, a click operation, a double-click operation, a long-press operation, a sweep operation, etc. The matching between the hotspot and the trigger zone here includes, but is not limited to, the situations that the trigger zone is located in the hotspot, a size of an overlap area between the trigger zone and the hotspot is greater than or equal to a preset threshold, etc. Of course, the first terminal device may also select the payment channel identifier indicated by the user operation from the at least one payment channel identifier in other ways. For example, the first terminal device may have a key for selecting a payment channel identifier, and the key may be a virtual key, a physical key, and the like. The user may operate the key to move a focus position between the at least one payment channel identifier provided. The first terminal device may take the payment channel identifier where the focus position is located as the payment channel identifier indicated by the user operation.

In another implementation of this embodiment, the first terminal device may have a preset default payment channel identifier. The first terminal device may acquire the default payment channel identifier.

It should be noted that persons skilled in the art would understand that the first terminal device may also acquire the payment channel identifier in other ways, which will not be enumerated here.

Step S14: the first terminal device broadcasts communication information including the feature information and the payment channel identifier via wireless communication.

In this embodiment, the first terminal device may be a terminal device that initiates establishment of a wireless communication connection. Specifically, the first terminal device may broadcast its own connection identifier via wireless communication. The connection identifier may be used to establish a wireless communication connection. The connection identifier may be different depending on the wireless communication connection of which establishment is to be initiated. For example, the first terminal device may be a terminal device that initiates establishment of a Bluetooth communication connection. Then, the first terminal device may broadcast its own physical address (Media Access Control, MAC) by Bluetooth communication. For another example, the first terminal device may be a terminal device that initiates establishment of a wireless fidelity communication connection. Then, the first terminal device may broadcast its own Service Set Identifier (SSID) by wireless fidelity communication. Of course, when establishment of other wireless communication connections is to be initiated, the connection identifier may be other identifiers of the first terminal device, which will not be enumerated here.

At least one terminal device located around the first terminal device may receive the connection identifier, and establish a wireless communication connection with the first terminal device based on the connection identifier.

The first terminal device may transmit the communication information to the at least one terminal device using the established wireless communication connection. The communication information may include the acquired feature information and the payment channel identifier. Specifically, the first terminal device may directly take the acquired feature information and the payment channel identifier as contents in the communication information. Alternatively, the first terminal device may further package the acquired feature information and the payment channel identifier into a communication datagram having a preset communication format, and take the communication datagram as the communication information.

Step S16: the second terminal device receives the communication information.

In this embodiment, the second terminal device may be any one of at least one terminal device located around the first terminal device. The second terminal device may use the established wireless communication connection to receive the communication information from the first terminal device.

Step S18: the second terminal device acquires its own feature information.

In this embodiment, the second terminal device may acquire its own feature information in the same way as in the aforementioned step S10 based on a presetting. For example, in the aforementioned step S10, the first terminal device may capture a desktop displayed by the second terminal device to acquire the image information, and take the captured image information as the feature information of the second terminal device. Then, the second terminal device may intercept the desktop displayed by itself to acquire the image information, and take the intercepted image information as its own feature information. For another example, in the aforementioned step S10, the first terminal device may capture a desktop displayed by the second terminal device to acquire the image information, and extract feature information from the captured image information. Then, the second terminal device may intercept the desktop displayed by itself to acquire the image information, and extract feature information from the intercepted image information.

Step S20: when the feature information of the second terminal device matches feature information in the communication information, the second terminal device generates a payment code based on the payment channel identifier, for the first terminal device to scan.

In this embodiment, the feature information of the second terminal itself and the feature information in the communication information may be matched in different ways depending on the feature information. For example, the feature information of the second terminal device itself may be image information, and the feature information in the communication information may be image information. Then, matching of the feature information of the second terminal itself with the feature information in the communication information may include that a similarity between the image information of the second terminal device itself and the image information in the communication information is greater than or equal to a preset threshold. Here, the second terminal device may use any calculation method for similarity of image information to calculate the similarity between the image information, such as a histogram matching algorithm, etc. For another example, the feature information of the second terminal device itself may be visual feature information extracted from the image information, and the feature information in the communication information may be visual feature information extracted from the image information. Then, matching of the feature information of the second terminal itself with the feature information in the communication information may include that the visual feature information of the second terminal device itself is the same as the visual feature information in the communication information.

In this embodiment, the second terminal device may regard itself as a terminal device to pay, when its own feature information matches the feature information in the communication information, and generate a payment code based on the payment channel identifier for the first terminal device to scan.

Specifically, as mentioned above, one payment application may be pre-associated with at least one payment channel identifier, and the payment channel identifiers pre-associated with different payment applications will be different. In this way, the second terminal device may invoke the payment application associated with the payment channel identifier, and generate a payment code corresponding to the payment channel identifier by the payment application. The payment channel used by the second terminal device when making a payment using the payment code may be the payment channel identified by the payment channel identifier.

Specifically, the second terminal device may acquire a payer identifier and generate a payment code using a payment code generation algorithm. The payer identifier may be included in the payment code. The payer identifier may be used to identify a payer, and may be the payer's name, account, or serial number, etc. The payment code generation algorithms may be the same or different depending on the payment code to be generated. For example, when a two-dimensional code is to be generated, the payment code generation algorithm may be a Quick Response code (QR-code) algorithm. Persons skilled in the art should understand that the QRcode algorithm here is only an example, and in fact any algorithm capable of generating a two-dimensional code may be applied here. Of course, when other payment codes are to be generated, the payment code generation algorithm may also be other algorithms, and will not be enumerated here.

In an implementation of this embodiment, the second terminal device may regard itself not as a terminal device to which a payment should be made when the own feature information does not match the feature information in the communication information, and the communication information may be ignored.

In an implementation of this embodiment, the second terminal device may acquire its own state information, and generate a payment code based on the payment channel identifier when the state information meets a preset condition and the own feature information matches the feature information in the communication information.

In this embodiment, the state information may indicate whether the screen is in a lit state. Accordingly, the preset condition may include that the screen is in a lit state. Of course, the state information may further include other information of the second terminal device, which is not specifically limited in this embodiment.

In this embodiment, the second terminal device may assume that itself may be a terminal device to pay when the state information satisfies a preset condition. The second terminal device may then match its own feature information with the feature information in the communication information to further determine whether itself is a terminal device to pay. When the feature information of the second terminal device matches the feature information in the communication information, the second terminal device may regard itself as the terminal device to pay, and generate a payment code based on the payment channel identifier. When the feature information of the second terminal device does not match the feature information in the communication information, the second terminal device may regard itself not as a terminal device to pay, and may ignore the communication information.

Further, in this embodiment, when the state information does not meet a preset condition, the second terminal device may regard itself not as a terminal device to pay and may ignore the communication information.

In an implementation of this embodiment, the first terminal device may scan the payment code generated by the second terminal device to acquire a payer identifier, acquire a payee identifier and a payment amount, and send to a payment server a payment request which may include the payer identifier, the payee identifier and the payment amount. The payment server may receive the payment request, and perform a payment operation based on the payer identifier, the payee identifier and the payment amount.

In this embodiment, the second terminal device may acquire a preset default amount or an amount inputted by a user, as the payment amount. The second terminal device may acquire a preset payee identifier or a payee identifier inputted by a user. The payee identifier may be used to identify a payee, and may be, for instance, the payee's name, account, or serial number. The payee may be a merchant that provides offline services to consumers, such as a shopping mall, a hotel, a restaurant, etc.

Further, in this embodiment, the communication information may further include a device identifier of the first terminal device for identifying a terminal device, such as a physical address (Media Access Control, MAC), or a model, etc. of the terminal device. The second terminal device may generate a payment code using a payment code generation algorithm and based on a payer identifier and a device identifier. The payment code may include the payer identifier and the device identifier. The first terminal device may scan the payment code generated by the second terminal device to acquire the payer identifier and the device identifier, and match its own device identifier with the device identifier in the payment code to verify the payment code. When the own device identifier matches the device identifier in the payment code, the first terminal device may regard that the payment code is generated in response to the communication information broadcasted by itself, and may send a payment request to the payment server based on the payment code. When the own device identifier does not match the device identifier in the payment code, the first terminal device may regard that the payment code is not generated in response to the communication information broadcasted by itself (e.g., the payment code may be generated by the second terminal device upon receipt of communication information broadcasted by a terminal device other than the first terminal device), and may ignore the payment code.

In this embodiment, the first terminal device may acquire the feature information of the second terminal device, acquire the payment channel identifier, and broadcast the communication information including the feature information and the payment channel identifier via wireless communication. The second terminal device may receive the communication information, acquire its own feature information, and generate a payment code based on the payment channel identifier for the first terminal device to scan, when the own feature information matches the feature information in the communication information. Therefore when the user makes payment for offline transaction, the second terminal device can generate a payment code for the first terminal device to scan without necessity of any excess operation, and thus the user experience is improved.

Please refer to FIGS. 2, 4, 5 and 6. An embodiment of the present disclosure provides another data processing method, which is executed by a first terminal and may include the following steps.

Step S30: acquiring feature information of a second terminal device.

Step S32: acquiring a payment channel identifier.

Step S34: broadcasting communication information via wireless communication.

In this embodiment, the first terminal device may broadcast the communication information including the feature information and the payment channel identifier via wireless communication, so that the second terminal device can generate a payment code based on the communication information.

It should be noted that the processes of the first terminal device acquiring the feature information of the second terminal device, acquiring the payment channel identifier, and broadcasting the communication information via wireless communication in this embodiment are substantially similar to the previous embodiments in the present disclosure, and therefore detailed description thereof is omitted herein. Reference can be made to the previous embodiments in the present disclosure in necessity.

In this embodiment, the first terminal may acquire the feature information of the second terminal device, acquire a payment channel identifier, and broadcast the communication information including the feature information and the payment channel identifier via wireless communication. In this way, with the feature information of the second terminal device, the first terminal device may identify the second terminal device from multiple terminal devices including the second terminal device via wireless communication, enabling the second terminal to generate the payment code.

Please refer to FIGS. 3, 4, 5 and 6. An embodiment of the present disclosure provides another data processing method, which is executed by a second terminal device and may include the following steps.

Step S40: receiving communication information broadcasted via wireless communication.

Step S42: acquiring its own feature information.

Step S44: generating a payment code based on the payment channel identifier when the own feature information matches feature information in the communication information.

It should be noted that the processes of the second terminal device receiving the communication information broadcasted via wireless communication, acquiring the own feature information, and generating the payment code based on the payment channel identifier are substantially similar to the previous embodiments in the present disclosure, and therefore detailed description thereof is omitted herein. Reference can be made to the previous embodiments in the present disclosure in necessity.

In this embodiment, the second terminal device may receive the communication information broadcasted via wireless communication, acquire its own feature information, and generates the payment code based on the payment channel identifier when the own feature information matches the feature information in the communication information. Therefore, when the user makes payment for offline transaction, the second terminal device can generate a payment code for the first terminal device to scan without necessity of any excess operation, and thus the user experience is improved.

Figure 7:
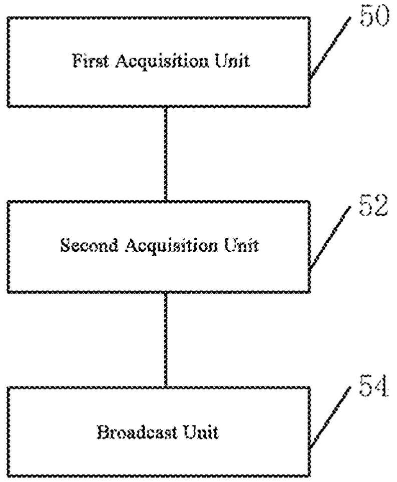
FIG. 7 is a functional structural diagram of a terminal device according to an embodiment of the present disclosure.

Please refer to FIG. 7. An embodiment of the present disclosure further provides a terminal device, which may include:

a first acquisition unit 50 configured to acquire feature information of a second terminal device;

a second acquisition unit 52 configured to acquire a payment channel identifier;

a broadcast unit 54 configured to broadcast communication information including the feature information and the payment channel identifier via wireless communication, to enable the second terminal device to generate a payment code based on the communication information.

Figure 8:
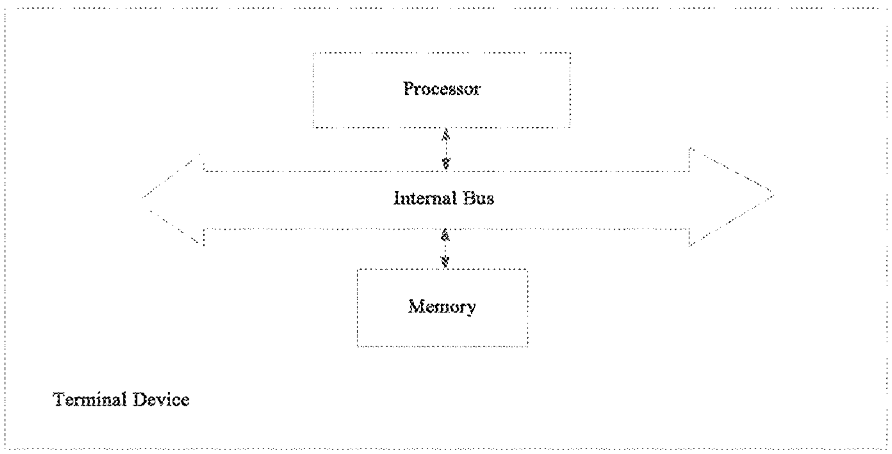
FIG. 8 is a functional structural diagram of a terminal device according to an embodiment of the present disclosure.

Please refer to FIG. 8. An embodiment of the present disclosure further provides another terminal device, which may include a memory and a processor.

In this embodiment, the memory may be implemented in any suitable manner. For example, the memory may be a read-only memory, a mechanical hard disk, a solid-state hard disk, or a USB flash disk, etc. The memory may be configured to store computer instructions.

In this embodiment, the processor may be implemented in any suitable manner. For example, the processor may take the form of such as a microprocessor or a processor, as well as a computer readable medium storing computer readable program codes (e.g., software or firmware) executable by the (micro) processor, a logic gate, a switch, an Application Specific Integrated Circuit (ASIC), a programmable logic controller, an embedded microcontroller, etc.

The processor may be configured to execute the computer instructions to implement the steps of: acquiring feature information of a second terminal device; acquiring a payment channel identifier; and broadcasting communication information including the feature information and the payment channel identifier via wireless communication, to enable the second terminal device to generate a payment code based on the communication information.

For specific functions implemented by the processor of the terminal device disclosed in this embodiment, reference can be made to the previous embodiments in the present disclosure.

Figure 9:
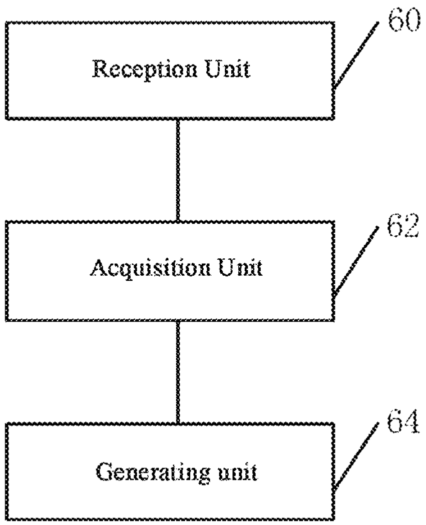
FIG. 9 is a functional structural diagram of a terminal device according to an embodiment of the present disclosure.

Please refer to FIG. 9. An embodiment of the present disclosure further provides another terminal device, which may include:

a reception unit 60 configured to receive communication information, which includes feature information and a payment channel identifier and which is broadcasted via wireless communication;

an acquisition unit 62 configured to acquire the terminal device's own feature information;

a generating unit 64 configured to generate a payment code based on the payment channel identifier when the own feature information matches feature information in the communication information.

Please refer to FIG. 8. An embodiment of the present disclosure further provides another terminal device, which may include a memory and a processor.

In this embodiment, the memory may be implemented in any suitable manner. For example, the memory may be a read-only memory, a mechanical hard disk, a solid-state hard disk, or a USB flash disk, etc. The memory may be configured to store computer instructions.

In this embodiment, the processor may be implemented in any suitable manner. For example, the processor may take the form of such as a microprocessor or a processor, as well as a computer readable medium storing computer readable program codes (e.g., software or firmware) executable by the (micro) processor, a logic gate, a switch, an Application Specific Integrated Circuit (ASIC), a programmable logic controller, an embedded microcontroller, etc.

The processor may be configured to execute the computer instructions to implement the steps of: receiving communication information, which includes feature information and a payment channel identifier and which is broadcasted via wireless communication; acquiring the terminal device's own feature information; and generating a payment code based on the payment channel identifier when the own feature information matches feature information in the communication information.

For specific functions implemented by the processor of the terminal device disclosed in this embodiment, reference can be made to the previous embodiments in the present disclosure.

It should be noted that the embodiments in the present disclosure are described in a progressive manner, which means descriptions of each embodiment are focused on the differences from other embodiments, and the descriptions of the same or similar aspects of the embodiments are applicable in common. In particular, the embodiments of the terminal device are analogue to the embodiments of the data processing method, therefore detailed description thereof is omitted and reference can be made to the embodiments of the data processing method.

In addition, it can be understood that in the light of the present disclosure, persons skilled in the art may conceive of any combination of some or all of the embodiments in the present disclosure without paying any creative effort, and it can be understood that these combinations fall within the scope of the present disclosure.

In the 1990s, it is easy to tell whether a technical improvement is a hardware improvement (for example, an improvement to a circuit structure such as a diode, a transistor, a switch, etc.), or a software improvement (an improvement to a methodical flow). However, with the development of technologies, many improvements to methodical processes nowadays can be regarded as improvements to the hardware circuit structures. Basically all improved methodical processes can be programmed into a hardware circuit to obtain corresponding hardware circuit structures. Therefore, it can not be ruled out to implement an improvement to a methodical process with a physical hardware module. For example, a Programmable Logic Device (PLD) (e.g., Field Programmable Gate Array (FPGA)) is an integrated circuit of which logical functions are determined by user's programming of the device. The designer programs by himself to 'integrate' a digital system onto a piece of PLD, without needing to design and manufacture the ASIC chip by a chip manufacturer. Moreover, at present, instead of manually manufacturing the integrated circuit chips, such programming is mostly implemented using software 'logic compiler', which is similar to the software compiler used for the program development, and the original codes to be compiled should be written in a specific programming language referred to as Hardware Description Language (HDL). There are many kinds of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., and currently the most commonly used is Very-High-Speed Integrated Circuit Hardware Description Language (VHDL) and Verilog2. It is comprehensible to those skilled in the art that a hardware circuit that implements a methodical process can be easily obtained by adequately programming the methodical process into an integrated circuit with the aforementioned hardware description languages.

The systems, devices, modules or units set forth in the above embodiments specifically may be implemented by a computer chip or entity, or by a product having a certain function. A typical device implementation is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or any combination thereof.

From the above description of the embodiments, it is clear to persons skilled in the art that the present disclosure may be implemented by means of software plus necessary general-purpose hardware platform. In this sense, the technical solutions of the present disclosure can essentially be, or a part thereof that manifests improvements over the prior art can be, embodied in the form of a computer software product, which may be stored in a storage medium such as an ROM/RAM, a magnetic disk, an optical disk, etc., and which may include instructions to cause a computer device (e.g., a personal computer, a server, or a network device, etc.) to perform the methods described in embodiments or some parts thereof in the present disclosure.

The present disclosure may be applied in many general-purpose or dedicated computer system environments or configurations, such as a personal computer, a server computer, a handheld device or a portable device, a tablet device, a multiprocessor system, a microprocessor-based system, a set-top box, a programmable consumption electronic device, a network PC, a minicomputer, a mainframe computer, a distributed computing environments including any of the above systems or devices, and the like.

The present disclosure may be described in the general context of computer executable instructions executed by the computer, e.g., a program module. In general, the program module includes a routine, a program, an object, a component, a data structure, etc. executing a particular task or realizing a particular abstract data type. The present disclosure may also be implemented in a distributed computing environments in which tasks are executed by remote processing devices connected through a communication network. In the distributed computing environments, the program modules may be located in a local and remote computer storage medium including a storage device.

Although the present disclosure has been described by means of the embodiments, persons of ordinary skill in the art will appreciate that there are many variations and modifications to the present disclosure without departing from the spirit of the present disclosure, and it is intended that the appended claims covers these variations and modifications without departing from the spirit of the present disclosure.

What is claimed is:

1. A data processing method implemented in a first terminal device, comprising:

photographing a desktop display of a second terminal device to acquire feature information of said second terminal device;

acquiring a payment channel identifier which is pre-associated with a predetermined payment application; and broadcasting communication information comprising said feature information and said payment channel identifier via wireless communication, to enable said second terminal device to generate a payment code based on said communication information, without opening a predetermined payment application in the second terminal device.

2. The method of claim 1, wherein photographing the desktop display of the second terminal device to acquire feature information of the second terminal device comprises:

capturing image information displayed on said second terminal device; and extracting feature information from said image information.

3. The method of claim 1, wherein acquiring the payment channel identifier comprises:

presenting at least one payment channel identifier;

selecting the payment channel identifier from said at least one payment channel identifier in response to a user operation; and including the selected payment channel identifier in the communication information.

4. The method of claim 1, wherein broadcasting the communication information via wireless communication comprises:

broadcasting, via wireless communication, a connection identifier of said first terminal device for establishing a wireless communication connection; and transmitting, upon establishment of the wireless communication connection based on said connection identifier, the communication information via the established wireless communication connection.

5. The method of claim 1, wherein said communication information further comprises a device identifier of said first terminal device, and said payment code comprises said device identifier.

6. The method of claim 5, further comprising:

scanning said payment code; and sending a payment request to a payment server based on said payment code, when the device identifier of said first terminal device matches the device identifier in said payment code.

7. A terminal device comprising:

a memory and a processor, wherein said memory is configured to store computer instructions, and wherein said processor is configured to execute said computer instructions to implement operations comprising:

photographing a desktop display of another terminal device to acquire feature information of said another terminal device;

acquiring a payment channel identifier which is pre-associated with a predetermined payment application; and broadcasting communication information comprising said feature information and said payment channel identifier via wireless communication, to enable said another terminal device to generate a payment code based on said communication information, without opening a predetermined payment application in said another terminal device.

8. The terminal device of claim 7, wherein the operations further comprise:

presenting at least one payment channel identifier;

selecting the payment channel identifier from the at least one payment channel identifier in response to a user operation; and including the selected payment channel identifier in the communication information.

9. A data processing method implemented in a terminal device, comprising:

receiving communication information broadcasted by another terminal device via wireless communication, which comprises feature information acquired by said another terminal device from a desktop display of said terminal device photographed by said another terminal device and a payment channel identifier which is pre-associated with a predetermined payment application;

acquiring feature information of said terminal device; and generating a payment code based on said payment channel identifier, without opening a predetermined payment application in said terminal device, when the acquired feature information matches the feature information in said communication information.

10. The method of claim 9, wherein receiving the communication information broadcasted via wireless communication comprises:

receiving a connection identifier broadcasted via wireless communication; and receiving, upon establishment of a wireless communication connection based on said connection identifier, the communication information via the established wireless communication connection.

11. The method of claim 9, wherein acquiring the feature information of said terminal device comprises:

acquiring image information displayed on said terminal device; and extracting the feature information from said image information.

12. The method of claim 9, wherein before generating the payment code based on the payment channel identifier, the method further comprises:

acquiring state information of said terminal device, and wherein generating the payment code based on said payment channel identifier comprises:

generating the payment code based on said payment channel identifier, when said state information meets a preset condition and the acquired feature information matches the feature information in said communication information.

13. The method of claim 9, further comprising:

ignoring said communication information, when the acquired feature information does not match the feature information in said communication information.

14. The method of claim 12, further comprising:

ignoring said communication information, when said state information does not meet the preset condition.

15. The method of claim 9, wherein generating the payment code based on said payment channel identifier comprises:

invoking a payment application associated with said payment channel identifier; and generating a payment code corresponding to said payment channel identifier by said payment application.

16. The method of claim 9, wherein said communication information further comprises a device identifier, and said payment code comprises said device identifier.

17. A terminal device comprising:

a memory and a processor, wherein said memory is configured to store computer instructions, and wherein said processor is configured to execute said computer instructions to implement operations comprising:

receiving communication information broadcasted by another terminal device via wireless communication, which comprises feature information acquired by said another terminal device from a desktop display of said terminal device photographed by said another terminal device and a payment channel identifier which is pre-associated with a predetermined payment application;

acquiring feature information of said terminal device; and generating a payment code based on said payment channel identifier, without opening a predetermined payment application in said terminal device, when the acquired feature information matches the feature information in said communication information.

* * * * *